US 12,216,835 B2

United States Patent
Pihl et al.

(10) Patent No.: US 12,216,835 B2
(45) Date of Patent: Feb. 4, 2025

(54) COMPUTER IMPLEMENTED METHOD FOR POSITIONING AND ORIENTING AN ELECTRONIC DEVICE IN A SHARED VIRTUAL SPACE

(71) Applicant: AUKI LABS LTD, Hong Kong (CN)

(72) Inventors: Nils Pihl, Hong Kong (CN); Andy Lau, Hong Kong (CN); Gustav Pihl, Karlskrona (SE); Ted Östrem, Taiwan (CN)

(73) Assignee: Auki Labs LTD, Hong Kong (CN)

( * ) Notice: Subject to any disclaimer, the term of this patent is extended or adjusted under 35 U.S.C. 154(b) by 0 days.

(21) Appl. No.: 18/571,167

(22) PCT Filed: Jun. 17, 2022

(86) PCT No.: PCT/CN2022/099351
§ 371 (c)(1),
(2) Date: Dec. 15, 2023

(87) PCT Pub. No.: WO2022/262834
PCT Pub. Date: Dec. 22, 2022

(65) Prior Publication Data
US 2024/0310927 A1  Sep. 19, 2024

(30) Foreign Application Priority Data

Jun. 18, 2021  (EP) .................................... 21180317

(51) Int. Cl.
*G06F 3/03* (2006.01)
(52) U.S. Cl.
CPC .................. *G06F 3/0317* (2013.01)
(58) Field of Classification Search
None
See application file for complete search history.

(56) References Cited

U.S. PATENT DOCUMENTS 10,803,666 B1 * 10/2020 Buerli .................. G06T 19/006
2017/0011553 A1   1/2017 Chen et al.
(Continued)

FOREIGN PATENT DOCUMENTS

EP   2348383 A1   7/2011

OTHER PUBLICATIONS

Search Report and Written Opinion received in International Application No. PCT/CN2022/099351, dated Sep. 20, 2022.

*Primary Examiner* — Stephen T. Reed
(74) *Attorney, Agent, or Firm* — Knobbe Martens Olson & Bear, LLP (57) ABSTRACT

A method for positioning and electronic devices in a virtual space comprising: imaging, by a camera of a second electronic device, a reference object displayed at a first electronic device; obtaining, from the first electronic device, a pointer to information pertaining to position of the first electronic device in a virtual space; obtaining physical dimensions of the reference object; obtaining current position of the first electronic device in the virtual space; determining a relative distance of the second electronic device to the first electronic device based on the physical dimensions of the reference object and dimensions of the reference object as imaged by the camera of the second electronic device; determining position of the second electronic device in the virtual space based on the current position of the first electronic device in the virtual space and the determined relative distance of the second electronic device to the first electronic device.

13 Claims, 4 Drawing Sheets

(56) References Cited

U.S. PATENT DOCUMENTS

2020/0089313 A1    3/2020  Himane
2020/0294311 A1*   9/2020  Holz .................... H04N 13/271

* cited by examiner

Fig. 4

COMPUTER IMPLEMENTED METHOD FOR POSITIONING AND ORIENTING AN ELECTRONIC DEVICE IN A SHARED VIRTUAL SPACE

TECHNICAL FIELD

The present invention relates to the field of augmented and virtual reality. More particularly, it relates to a method for positioning and orienting a second electronic device in a virtual space to be shared with a first electronic device already positioned and oriented in the virtual space.

BACKGROUND OF THE INVENTION

During recent years, applications using augmented reality or virtual reality have become more and more common. Augmented reality applications allow a user to experience a combined real and virtual world by placing a virtual reality world over the real world that the user sees. Virtual reality on the other hand puts the user in a completely virtual world centered around the user.

However, there are limitations with today's technology in regard to sharing the virtual or partly virtual world between users. In particular, there is a need for improvements related to positioning and orienting a device in a pre-existing virtual world.

SUMMARY OF THE INVENTION

In view of the above, it is an object of the present invention to provide a method for positioning and orienting a second electronic device in a virtual space to be shared with a first electronic device already positioned and oriented in the virtual space.

It has been realized that by orienting and positioning a second device relative to a first device by providing a reference object on the first device, the second device can be oriented and positioned in the same virtual space as the first device, knowing the orientation and position of the first device in the virtual space. This can be done in a precise and effective way.

According to a first aspect, a computer implemented method for positioning and orienting a second electronic device in a virtual space to be shared with a first electronic device already positioned and oriented in the virtual space is presented. The method comprising: imaging, by a camera of the second electronic device, a reference object displayed on a display of the first electronic device; obtaining, from the first electronic device, a pointer to where to access a virtual space layer being a place in the cloud where information pertaining to position and orientation of the first electronic device in the virtual space is stored; obtaining known physical dimensions and appearance of the reference object as displayed on the display of the first electronic device; obtaining current position and orientation of the first electronic device in the virtual space by accessing the virtual space layer comprising information pertaining to position and orientation of the first electronic device in the virtual space; determining a relative distance and orientation of the second electronic device to the first electronic device based on the known physical dimensions and appearance of the reference object as displayed on the display of the first electronic device and apparent dimensions and appearance of the reference object as imaged by the camera of the second electronic device; and determining position and orientation of the second electronic device in the virtual space based on the current position and orientation of the first electronic device in the virtual space and the determined relative distance and orientation of the second electronic device to the first electronic device.

The virtual space may be part of a partly virtual world, such as an augmented reality world. Alternatively, the virtual space may be part of a completely virtual world, such as a virtual reality world.

By the term "known", as in "known physical dimensions and appearance", it is hereby meant that the physical dimensions and appearance is pre-determined. Put differently, the reference object has physical dimensions and appearance which are known in advance such that it can be compared to the apparent dimensions and appearance of the imaged reference object.

By the term "apparent", as in "apparent dimensions and appearance", it is hereby meant that the dimensions and appearance is as they appear when imaged by the camera. In other words, the apparent dimensions and appearance of the reference object may differ from the physical dimensions and appearance.

The orientation of the second electronic device to the first electronic device may comprise information about how the second electronic device is rotated in relation to the first electronic device. The orientation of the second electronic device to the first electronic device may comprise information about in what direction the second electronic device is located in relation to the first electronic device.

It is known to the skilled person that if an object with known physical dimensions and appearance is imaged by a device, a relative distance and orientation of the device to the object can be determined by using the known physical dimensions and appearance of the object and the apparent dimensions and appearance of the imaged object.

The appearance may for example comprise a shape and/or a pattern of the reference object. The appearance may comprise information pertaining to the orientation of the reference object. As an example, the appearance may comprise information about how the reference object is rotated.

A possible associated advantage is that, by the proposed method, a virtual reality or augmented reality world can be shared between two or more devices in a precise and reliable way.

The method may further comprise displaying, on a display of the first electronic device, the reference object with the known physical dimensions and appearance.

By obtaining information pertaining to position and orientation of the first electronic device in the virtual space it may be safeguarded that updated information on orientation and position of the first electronic device in the virtual space is provided to the second electronic device.

The current position and orientation of the first electronic device in the virtual space may be a position and orientation of the first electronic device in the virtual space at a time of imaging the reference object displayed on the display of the first electronic device. In other words, the term current may refer to the point in time in which the act of imaging is performed. Thus, the current position and orientation of the first electronic device is the position and orientation of said device when the act of imaging is taking place.

Obtaining known physical dimensions and appearance of the reference object may comprise accessing a virtual space layer comprising the known physical dimensions and appearance of the reference object. Obtaining known physical dimensions and appearance of the reference object may comprise retrieving the known physical dimensions and appearance of the reference object from a virtual space layer.

The virtual space layer may be a place where information about the virtual space is stored. The virtual space layer may further comprise information pertaining to position and orientation of the portable electronic device in the virtual space. The virtual space layer may further comprise information pertaining to virtual objects shown in the virtual space. The virtual space layer may be provided in the cloud. Alternatively, the virtual space layer may be provided on the portable electronic device.

Obtaining the pointer to where to access the virtual space layer may comprise decoding an image of the reference object and extracting the pointer from the image of the reference object.

Information pertaining to the pointer may be encoded into the image of the reference object as a machine-readable optical label.

Obtaining current position and orientation of the first electronic device in the virtual space may comprise accessing a virtual space layer comprising information pertaining to position and orientation of the first electronic device in the virtual space.

The method may further comprise transferring, from the first electronic device to the second electronic device, a pointer to the virtual space layer. In other words, the pointer may point to where the second electronic device can find the virtual space layer. Put differently, the pointer to the virtual space layer may comprise information of where to access the virtual space layer.

The act of obtaining known physical dimensions and appearance of the reference object may comprise: displaying, on the display of the first electronic device, information pertaining to known physical dimensions and appearance of the reference object, and acquiring at the second electronic device the information pertaining to known physical dimensions and appearance of the reference object, using the camera of the second electronic device.

The method may further comprise encoding the information pertaining to known physical dimensions and appearance of the reference object as a machine-readable optical label. Displaying the information pertaining to known physical dimensions and appearance of the reference object may comprise displaying the machine-readable optical label. Acquiring the information pertaining to known physical dimensions and appearance of the reference object may comprise decoding the machine-readable optical label.

The act of obtaining current position and orientation of the first electronic device in the virtual space may comprise: displaying, on the display of the first electronic device, information pertaining to position and orientation of the first electronic device in the virtual space, and acquiring at the second electronic device the information pertaining to position and orientation of the first electronic device in the virtual space, using the camera of the second electronic device.

The method may further comprise encoding the information pertaining to current position and orientation of the first electronic device in the virtual space as a machine-readable optical label. Displaying the information pertaining to current position and orientation of the first electronic device in the virtual space may comprise displaying the machine-readable optical label. Acquiring the information pertaining to current position and orientation of the first electronic device in the virtual space may comprise decoding the machine-readable optical label.

The machine-readable optical label may constitute the reference object.

According to a second aspect, a first non-transitory computer-readable storage medium having stored thereon instructions for implementing the method according to the first aspect, when executed on a device having processing capabilities, is provided.

According to a third aspect, a second non-transitory computer-readable recording medium having recorded thereon a program executable on an electronic device having processing capabilities, is provided. The program comprising program code portions which when executed on the electronic device is configured to execute an information obtaining function configured to obtain current position and orientation of a portable electronic device positioned and oriented in a virtual space, (the portable electronic device being a different electronic device than the electronic device executing the program code portions); and execute an imaging function, configured to image, by a camera of the electronic device, a reference object displayed on a display of the portable electronic device. The program further comprising program code portions which when executed on the electronic device is configured to execute an orientation function configured to: determine a relative distance and orientation of the electronic device to the portable electronic device based on the known physical dimensions and appearance of the reference object as displayed on the display of the portable electronic device and apparent dimensions and appearance of the reference object as imaged by the camera of the electronic device, and determine position and orientation of the electronic device in the virtual space based on the current position and orientation of the portable electronic device in the virtual space and the determined relative distance and orientation of the electronic device to the portable electronic device. The information obtaining function, upon being executed, is further configured to obtain a pointer to where to access a virtual space layer being a place in the cloud where information pertaining to position and orientation of the portable electronic device in the virtual space is stored; obtain known physical dimensions and appearance of the reference object as displayed on the display of the portable electronic device; and obtain current position and orientation of the portable electronic device in the virtual space by accessing the virtual space layer comprising information pertaining to position and orientation of the portable electronic device in the virtual space.

The program may be an application downloadable to the electronic device via an application providing service.

The electronic device configured to execute the program of this third aspect may be a portable electronic device, such as a smart phone.

According to a fourth aspect, a third non-transitory computer-readable recording medium having recorded thereon a program executable on a portable electronic device having processing capabilities, is provided. The program comprising program code portions which when executed on the portable electronic device is configured to execute: a display function, configured to display, on a display of the portable electronic device, a reference object having known physical dimensions and appearance; and an encoding function configured to encode information into an image of the reference object.

The encoding function may be configured to encode information into the image of the reference object in the form of information comprising a pointer to where to access a virtual space layer being a place in the cloud where information pertaining to position and orientation of the portable electronic device in the virtual space is stored.

The program may be an application downloadable to the portable electronic device via an application providing service.

The portable electronic device configured to execute the program of this fourth aspect may be a smartphone.

The above-mentioned features and advantages of the first aspect, when applicable, apply to the second, third and fourth aspects as well. To avoid undue repetition, reference is made to the above.

Still other objectives, features, aspects, and advantages of the invention will appear from the following detailed description as well as from the drawings. The same features and advantages described with respect to one aspect are applicable to the other aspects unless explicitly stated otherwise.

BRIEF DESCRIPTION OF THE DRAWINGS

The above and other aspects of the present inventive concept will now be described in more detail, with reference to appended drawings showing variants of the invention. The figures should not be considered limiting the invention to the specific variant; instead they are used for explaining and understanding the inventive concept.

As illustrated in the figures, the sizes of layers and regions are exaggerated for illustrative purposes and, thus, are provided to illustrate the general structures of variants of the present inventive concept. Like reference numerals refer to like elements throughout.

DETAILED DESCRIPTION

The present inventive concept will now be described more fully hereinafter with reference to the accompanying drawings, in which currently preferred variants of the inventive concept are shown. This inventive concept may, however, be implemented in many different forms and should not be construed as limited to the variants set forth herein; rather, these variants are provided for thoroughness and completeness, and fully convey the scope of the present inventive concept to the skilled person.

A computer implemented method for positioning and orienting a second electronic device in a virtual space to be shared with a first electronic device already positioned and oriented in the virtual space, as well as the first and second electronic device and system thereof will now be described with reference to FIG. 1 to FIG. 4.

Figure 1:
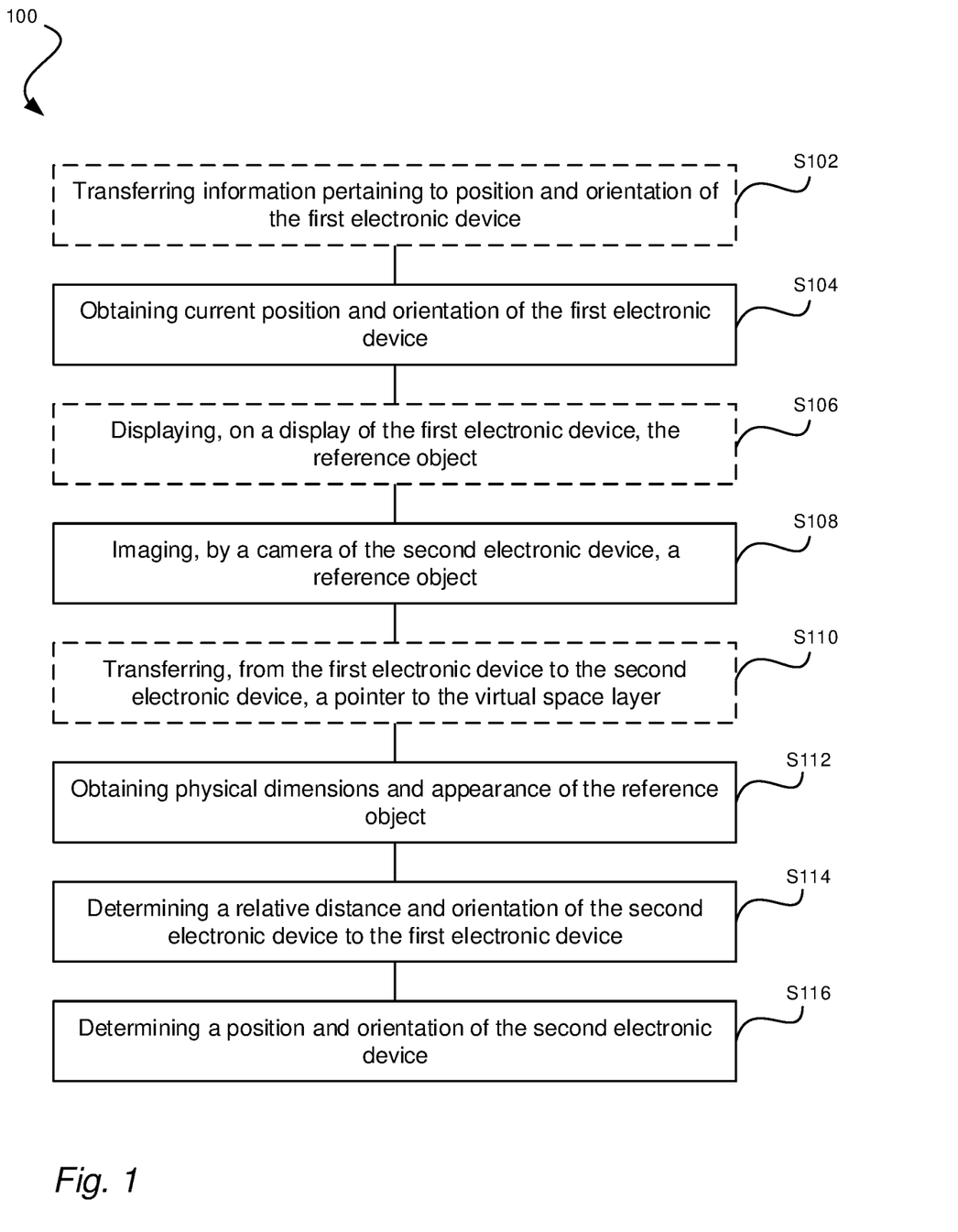
FIG. 1 is a flow chart illustrating the steps of a computer implemented method for positioning and orienting a second electronic device in a virtual space to be shared with a first electronic device already positioned and oriented in the virtual space.

FIG. 1 is a flow chart illustrating the steps of the method 100 for positioning and orienting a second electronic device in a virtual space to be shared with a first electronic device already positioned and oriented in the virtual space. Below, the different steps is described in more detail. Even though illustrated in a specific order, the steps of the method 100 may be performed in any suitable order, in parallel, as well as multiple times.

A current position and orientation of the first electronic device in the virtual space is obtained S104.

A reference object displayed on a display of the first electronic device is imaged S108 by a camera of the second electronic device. The reference object may be imaged S108 by capturing image data of the reference object using the camera of the second electronic device. The image data may be a single image of the reference object. Alternatively, the image data may comprise multiple images, such as a video feed of the reference object.

The current position and orientation of the first electronic device in the virtual space may be the position and orientation of the first electronic device at a time of imaging the reference object. In other words, obtaining S104 the current position and orientation of the first electronic device may be performed at the same time as imaging S108 the reference object. This may be facilitated by synchronizing clocks of the first and second electronic device.

Known physical dimensions and appearance of the reference object as displayed on the display of the first electronic device is obtained S112.

By the term "known", as in "known physical dimensions and appearance", it is hereby meant that the physical dimensions and appearance is pre-determined. Put differently, the reference object has physical dimensions and appearance which is known in advance such that it can be compared to the apparent dimensions and appearance of the imaged reference object.

The appearance may for example comprise a shape and/or a pattern of the reference object. The appearance may comprise information pertaining to the orientation of the reference object. As an example, the appearance may comprise information about how the reference object is rotated.

A relative distance and orientation of the second electronic device to the first electronic device is determined S114 based on the known physical dimensions and appearance of the reference object as displayed on the display of the first electronic device and apparent dimensions and appearance of the reference object as imaged by the camera of the second electronic device. Put differently, the relative distance and orientation of the second device to the first device may be determined S114 using a relationship between the known physical dimensions and appearance of the reference object and the apparent dimensions and appearance of the imaged reference object. In other words, the relative distance and orientation of the second electronic device to the first electronic device can be determined S114 by determining a transformation between the displayed reference object and the imaged reference object.

The position and orientation of the second electronic device in the virtual space is determined S116 based on the current position and orientation of the first electronic device in the virtual space and the determined relative distance and orientation of the second electronic device to the first electronic device.

All of the above steps may be performed at the second electronic device. The second electronic device may be a portable electronic device. Alternatively, the second electronic device may be a stationary electronic device. The first electronic device may be a portable electronic device, such as a smartphone, a tablet, a laptop, a smart watch, smart glasses, augmented reality (AR) glasses, AR lenses or any other suitable device.

The reference object with the known physical dimensions and appearance may be displayed S106 on a display of the first electronic device.

Information pertaining to position and orientation of the first electronic device in the virtual space may be transferred S102, from the first electronic device to the second electronic device. The act of transferring the information pertaining to position and orientation of the first electronic device in the virtual space may be part of the act of obtaining S104 the current position and orientation of the first electronic device.

The term "pertaining to" is to be interpreted as that the information can be directly transferred from the first electronic device to the second electronic device, or as that a pointer to where the second electronic device can retrieve the information is transferred from the first electronic device to the second electronic device. The direct transfer and transfer via a pointer where to retrieve the information will be discussed in more detail directly below.

The act of obtaining S112 the known physical dimensions and appearance of the reference object may comprise accessing a virtual space layer comprising the known physical dimensions and appearance of the reference object.

The act of obtaining S104 the current position and orientation of the first electronic device in the virtual space may comprise accessing a virtual space layer comprising information pertaining to position and orientation of the first electronic device in the virtual space.

A pointer to the virtual space layer may be transferred S110 from the first electronic device to the second electronic device. The act of transferring the pointer may be part of the act of obtaining S112 the known physical dimensions and appearance of the reference object.

The act of obtaining S112 known physical dimensions and appearance of the reference object as displayed on the display of the first electronic device may comprise displaying, on the display of the first electronic device, information pertaining to known physical dimensions and appearance of the reference object. The act of obtaining S112 known physical dimensions and appearance of the reference object as displayed on the display of the first electronic device may further comprise acquiring at the second electronic device the information pertaining to physical dimensions and appearance of the reference object, using the camera of the second electronic device. This is an example of direct transfer of information from the first electronic device to the second electronic device.

The information pertaining to known physical dimensions and appearance of the reference object may be encoded as a machine-readable optical label. The act of displaying the information pertaining to known physical dimensions and appearance of the reference object may then comprise displaying the machine-readable optical label. The act of acquiring the information pertaining to physical dimensions and appearance of the reference object may then comprise decoding the machine-readable optical label. This is an example of direct transfer of information from the first electronic device to the second electronic device.

The machine-readable label may be a two-dimensional code, such as a QR code.

The act of obtaining S104 current position and orientation of the first electronic device in the virtual space may comprise displaying, on the display of the first electronic device, information pertaining to position and orientation of the first electronic device in the virtual space. The act of obtaining S104 current position and orientation of the first electronic device in the virtual space may further comprise acquiring at the second electronic device the information pertaining to position and orientation of the first electronic device in the virtual space, using the camera of the second electronic device. This is an example of direct transfer of information from the first electronic device to the second electronic device.

The information pertaining to current position and orientation of the first electronic device in the virtual space may be encoded as a machine-readable optical label. The act of displaying the information pertaining to current position and orientation of the first electronic device in the virtual space may then comprise displaying the machine-readable optical label. The act of acquiring the information pertaining to current position and orientation of the first electronic device in the virtual space may then comprise decoding the machine-readable optical label.

The machine-readable optical label may constitute the reference object. Put differently, the reference object may be provided within the machine-readable optical label.

Figure 2:
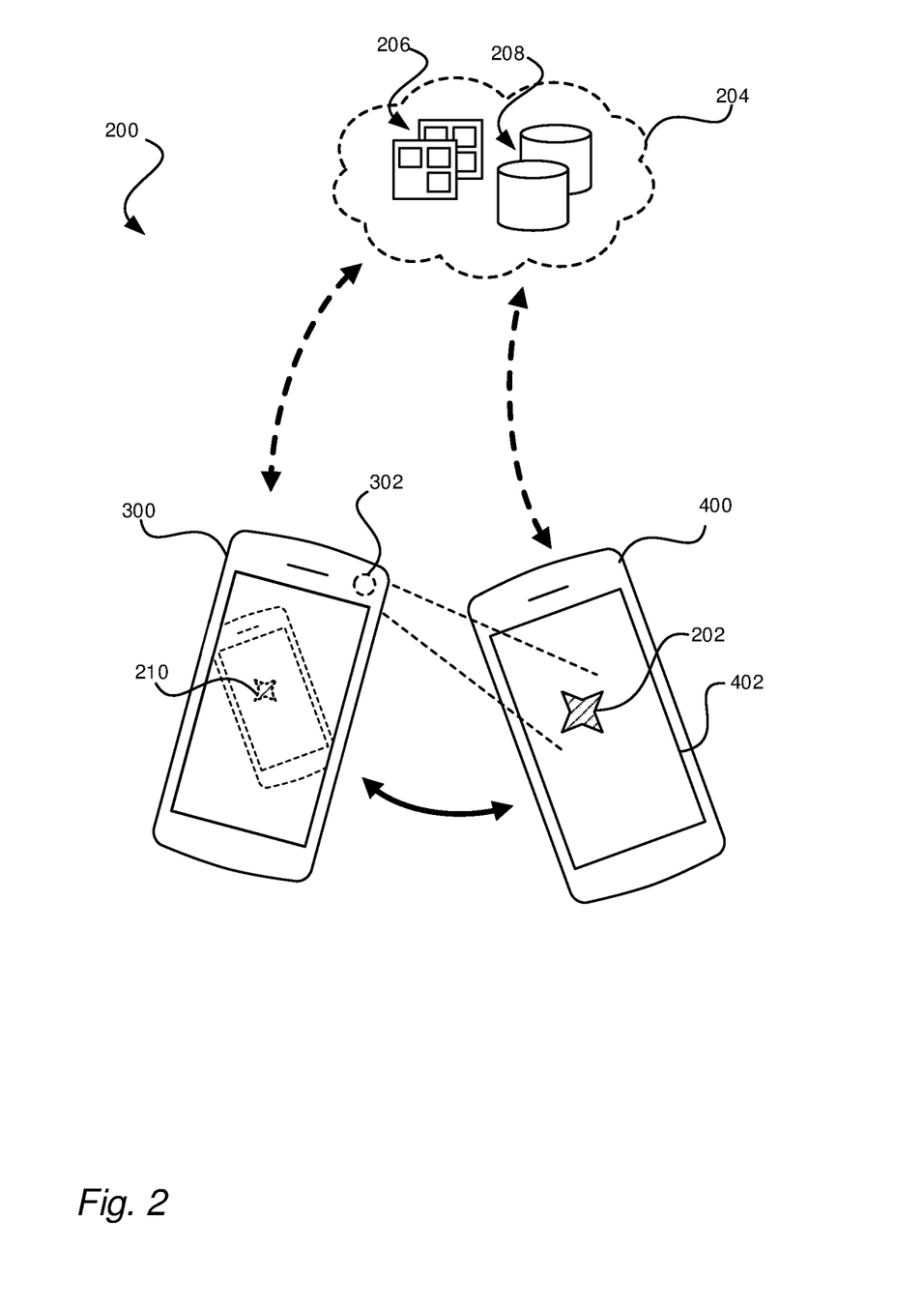
FIG. 2 schematically illustrates, a system for orienting and positioning an electronic device in a virtual space shared with a portable electronic device.

FIG. 2 schematically illustrates a system 200 for sharing a virtual space between multiple devices. The system 200 allows an electronic device 300 to be positioned and oriented in the virtual space to be shared with a portable electronic device 400 already positioned and oriented in the virtual space. Using the wording of the method discussed above in connection with the method 100, the portable electronic device 400 is to be seen as the first electronic device and the electronic device 300 is to be seen as the second electronic device. The system 200 comprises the electronic device 300 and the portable electronic device 400. However, the system 200 may comprise more than one electronic device 300 and/or more than one portable electronic device 400.

Figure 4:
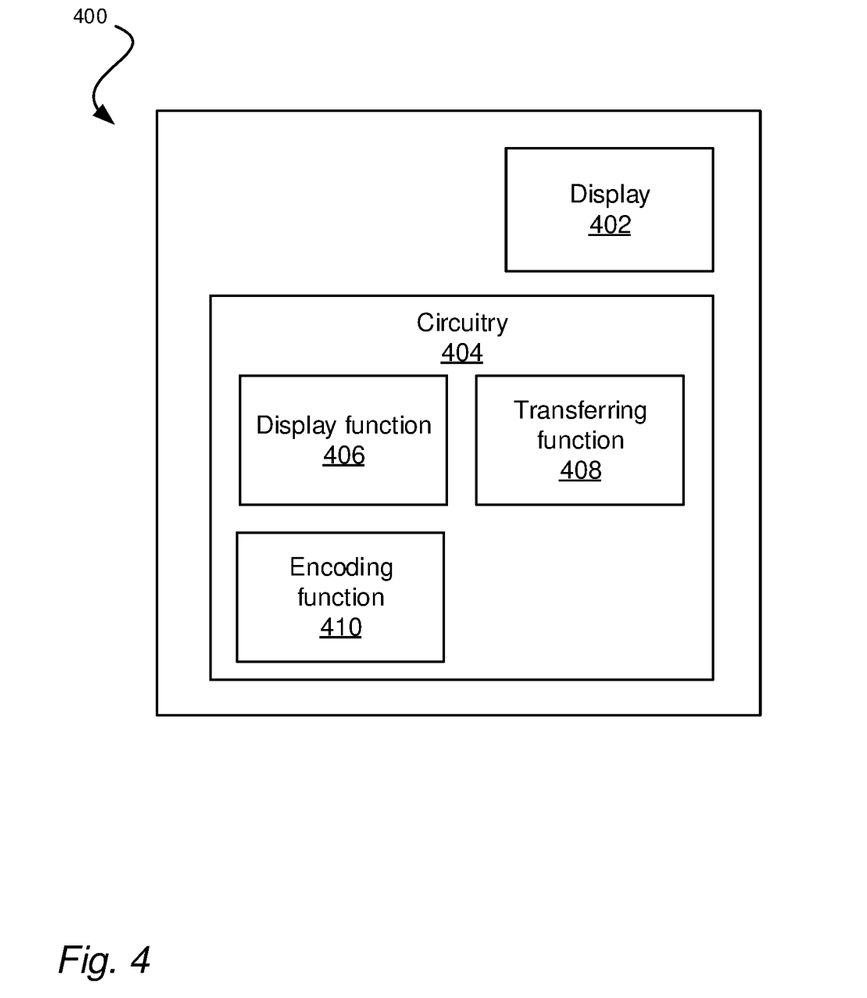
FIG. 4 illustrates, by way of example, a portable electronic device oriented and positioned in a virtual space.

The portable electronic device 400, which is further described in connection with FIG. 4 is positioned and oriented in the virtual space. As an example, the virtual space may be a virtual reality world. Alternatively, the virtual space may be a virtual part of an augmented reality world. The portable electronic device 400 may be described as a host device in the sense of hosting the virtual space to be shared with other devices. Alternatively, the portable electronic device 400 may be positioned and oriented in the virtual space hosted by another device. The another device hosting the virtual space may be a physical server. The another device hosting the virtual space may be a cloud implemented server. The another device hosting the virtual space may be another portable electronic device. As non-limiting examples, the portable electronic device 400 may be a smartphone, a tablet, a laptop, a smart watch, smart glasses, AR glasses, AR lenses or any other suitable device.

The electronic device 300 may be the second electronic device as described above in relation with FIG. 1. The electronic device 300 is further described in connection with FIG. 3. As non-limiting examples, the electronic device 300 may be a smartphone, a tablet, a laptop, a smart watch, smart glasses, AR glasses, AR lenses, a camera, or any other suitable device.

Even though the electronic device 300 and the portable electronic device 400 is herein illustrated as similar looking device, they may be different types of devices.

The electronic device 300 may be connected to a digital network, such as a mobile network (e.g. 3G, 4G, 5G, or the like) or a WiFi network. The portable electronic device 400 may be connected to a digital network, such as a mobile network (e.g. 3G, 4G, 5G, or the like) or a WiFi network. The electronic device 300 and the portable electronic device 400 may be communicatively connected to each other via wireless connection, such as a Bluetooth connection, via a WiFi Network or a mobile network (e.g. 3G, 4G, 5G, or the like).

The system 200 may further comprise one or more remote servers 206 and/or one or more databases 208. The one or more remote servers 206 and/or databases 208 may for instance be provided in a cloud 204 as illustrated herein. The electronic device 300 and/or the portable electronic device 400 may be communicatively connected to the one or more remote servers 206 and/or one or more databases 208. The one or more remote servers 206 may perform parts of the functions of the electronic device 300 and/or the portable electronic device 400 as described in connection with FIG. 3 and FIG. 4. The one or more databases 208 may comprise at least a part of information described in connection with FIG. 3 and FIG. 4. For example, the one or more databases 208 may comprise information pertaining to physical dimensions and appearance of a reference object 202 displayed on a display 402 of the portable electronic device 400. It is hereby noted that the physical dimensions and appearance of the reference object illustrated herein should be regarded as a non-limiting example.

Upon having positioned and oriented the electronic device 300 in the virtual space of which the portable electronic device 400 is already positioned and oriented, the position and orientation of the respective electronic devices may be continuously transferred between the respective electronic devices in order to keep the respective electronic devices oriented and positioned.

Figure 3:
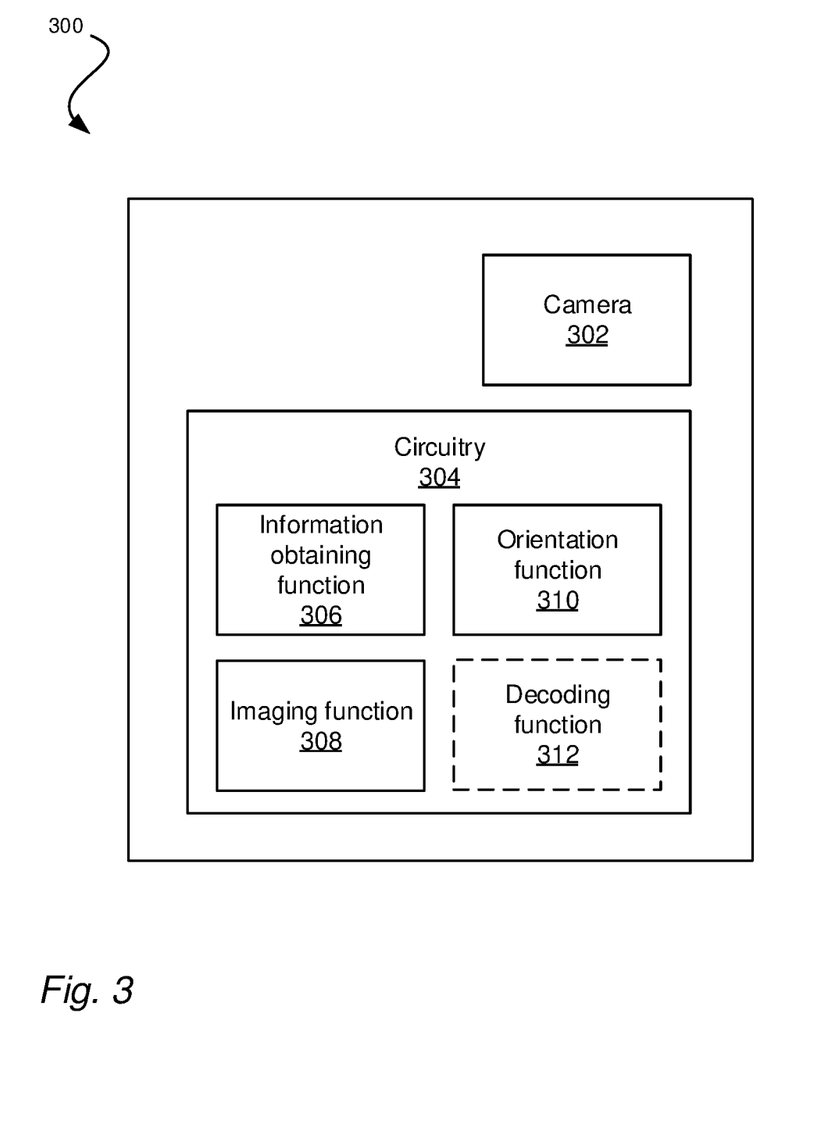
FIG. 3 schematically illustrates, by way of example, an electronic device to be oriented and positioned in a virtual space.

FIG. 3 schematically illustrates the electronic device 300 as described in connection with FIG. 2. The electronic device 300 comprises a camera 302 and circuitry 304.

The circuitry 304 may be any type of circuitry 304 comprising a processing unit. The circuitry 304 may physically comprise one single circuitry device. Alternatively, the circuitry 304 may be distributed over several circuitry devices. The circuitry 304 may comprise a transceiver, a control circuit and a memory.

The transceiver may be configured to enable the circuitry 304 to communicate with other devices.

The control circuit may be configured to carry out overall control of functions and operations of the circuitry 304. The control circuit may include a processor, such as a central processing unit (CPU), microcontroller, or microprocessor. The processor may be configured to execute program code stored in the memory, in order to carry out functions and operations of the circuitry 304.

The memory may be one or more of a buffer, a flash memory, a hard drive, a removable media, a volatile memory, a non-volatile memory, a random access memory (RAM), or another suitable device. In a typical arrangement, the memory may include a non-volatile memory for long term data storage and a volatile memory that functions as system memory for the control circuit. The memory may exchange data with the control circuit over a data bus. Accompanying control lines and an address bus between the memory and the control circuit also may be present.

Functions and operations of the circuitry 304 may be embodied in the form of executable logic routines (e.g., lines of code, software programs, etc.) that are stored on a non-transitory computer readable recording medium (e.g., the memory) of the circuitry 304 and are executed by the control circuit (e.g. using the processor). Furthermore, the functions and operations of the circuitry 304 may be a stand-alone software application or form a part of a software application that carries out additional tasks related to the circuitry. The described functions and operations may be considered a method that the corresponding device is configured to carry out. Such as the method discussed above in connection with FIG. 1. Also, while the described functions and operations may be implemented in software, such functionality may as well be carried out via dedicated hardware or firmware, or some combination of hardware, firmware and/or software. The following functions may be stored on the non-transitory computer readable recording medium.

The circuitry 304 is configured to execute an information obtaining function 306, configured to obtain current position and orientation of the portable electronic device 400 positioned and oriented in the virtual space.

The circuitry 304 is configured to execute an imaging function 308, configured to image, by the camera 302, a reference object 202 displayed on a display 402 of the portable electronic device 400.

The information obtaining function 308 is further configured to obtain known physical dimensions and appearance of the reference object 202 as displayed on the display 402 of the portable electronic device 400.

The circuitry 304 is further configured to execute an orientation function 310. The orientation function 310 is configured to determine a relative distance and orientation of the electronic device 300 to the portable electronic device 400 based on the known physical dimensions and appearance of the reference object 202 as displayed on the display 402 of the portable electronic device 400 and apparent dimensions and appearance of the imaged reference object 210 as imaged by the camera 302 of the electronic device 300. The orientation function 310 is configured to determine position and orientation of the electronic device 300 in the virtual space based on the current position and orientation of the portable electronic device 400 in the virtual space and the determined relative distance and orientation of the electronic device 300 to the portable electronic device 400.

The electronic device 300 may acquire information from the portable electronic device 400 displayed on the display 402 of the portable electronic device 400 by using the camera 302. The information may be acquired by capturing image data of the information displayed on the display 402 of the portable electronic device, or by scanning a machine-readable optical label displayed on the display 402.

Alternatively, or in combination, the electronic device 300 may acquire information from the portable electronic device 400 via a wireless connection between the electronic device 300 and the portable electronic device 400.

The circuitry 304 may further be configured to execute a decoding function 312 configured to decode the machine-readable optical label.

FIG. 4 schematically illustrates the portable electronic device 400 as described in connection with FIG. 2 and FIG. 3. The portable electronic device 400 comprises a display 402 and circuitry 404.

The circuitry 404 may be any type of circuitry 404 comprising a processing unit. The circuitry 404 may physically comprise one single circuitry device. Alternatively, the circuitry 404 may be distributed over several circuitry devices. The circuitry 404 may comprise a transceiver, a control circuit and a memory.

The transceiver may be configured to enable the circuitry 404 to communicate with other devices.

The control circuit may be configured to carry out overall control of functions and operations of the circuitry 404. The control circuit may include a processor, such as a central processing unit (CPU), microcontroller, or microprocessor. The processor may be configured to execute program code stored in the memory, in order to carry out functions and operations of the circuitry 404.

The memory may be one or more of a buffer, a flash memory, a hard drive, a removable media, a volatile memory, a non-volatile memory, a random access memory (RAM), or another suitable device. In a typical arrangement, the memory may include a non-volatile memory for long term data storage and a volatile memory that functions as system memory for the control circuit. The memory may exchange data with the control circuit over a data bus. Accompanying control lines and an address bus between the memory and the control circuit also may be present.

Functions and operations of the circuitry 404 may be embodied in the form of executable logic routines (e.g., lines of code, software programs, etc.) that are stored on a non-transitory computer readable recording medium (e.g., the memory) of the circuitry 404 and are executed by the control circuit (e.g. using the processor). Furthermore, the functions and operations of the circuitry 404 may be a stand-alone software application or form a part of a software application that carries out additional tasks related to the circuitry. The described functions and operations may be considered a method that the corresponding device is configured to carry out. Such as the method discussed above in connection with FIG. 1. Also, while the described functions and operations may be implemented in software, such functionality may as well be carried out via dedicated hardware or firmware, or some combination of hardware, firmware and/or software. The following functions may be stored on the non-transitory computer readable recording medium.

The circuitry 404 is configured to execute a display function 406, configured to display, on the display 402, the reference object 202 having known physical dimensions and appearance.

The circuitry 404 is further configured to execute a transferring function 408, configured to transfer, to another electronic device, such as the electronic device 300 described in connection with FIGS. 2 and 3, information pertaining to current position and orientation of the portable electronic device 400 in the virtual space. The transferring function 408 may transfer the information pertaining to current position and orientation of the portable electronic device 400 in the virtual space together with a timestamp of the current time.

The transferring function 408 may be configured to transfer a pointer to a virtual space layer to the electronic device 300. The virtual space layer may comprise the known physical dimensions and appearance of the reference object 202. The virtual space layer may further comprise information pertaining to position and orientation pf the portable electronic device 400. The virtual space layer may further comprise information pertaining to virtual objects shown in the virtual space. The virtual space layer may be provided in the cloud 204. Alternatively, the virtual space layer may be provided on the portable electronic device 400. The pointer to the virtual space layer may comprise information of where to access the virtual space layer. The electronic device 300 may access the virtual space layer directly, without using the pointer.

The display function 406 may be configured to display the information pertaining to known physical dimensions and appearance of the reference object 202 and/or the information pertaining to position and orientation of the portable electronic device 400 in the virtual space. The circuitry 404 may be configured to execute an encoding function 410, configured to encode the information pertaining to known physical dimensions and appearance of the reference object 202 and/or the information pertaining to position and orientation of the portable electronic device 400 in the virtual space as a machine-readable optical label. The display function 406 may be configured to display the encoded information as the machine-readable optical label. The machine-readable optical label may for example be a QR code.

The machine-readable optical label may constitute the reference object 202. Put differently, the machine-readable optical label may also function as the reference object 202. Alternatively, the machine-readable optical label may comprise the reference object 202. The machine-readable optical code may further comprise the timestamp of which the current position and orientation of the portable electronic device 400 are associated with. The machine-readable optical code may comprise the pointer to the virtual space layer.

The portable electronic device 400 may function as an anchor between the virtual space and the real world since its orientation and position in both worlds are known.

As described above, the pointer to the virtual space layer may be transferred S1110 from the first electronic device to the second electronic device. In other words, the second electronic device may obtain the pointer from the first electronic device. The pointer may indicate where to access the virtual space layer which is a place in the cloud where information pertaining to position and orientation of the portable electronic device in the virtual space is stored. The pointer may be obtained by the second electronic device by using the image of the reference object, not by the first electronic device transferring to the second electronic device.

The first electronic device may encode the pointer into the image of the reference object. In other words, information pertaining to the pointer is encoded into the image of the reference object as a machine-readable optical label by the first electronic device. The image would be a machine-readable optical label. For encoding, the first electronic device may further comprise encoding function configured to encode information into an image of an object. The encoding function may be configured to encode pointer into the image of the reference object.

As mentioned above, the first electronic device comprises the imaging function 308. The information obtaining function is configured to obtain a pointer to where to access a virtual space layer being a place in the cloud where information pertaining to position and orientation of the portable electronic device 400 in the virtual space is stored. The virtual space layer may comprise information pertaining to known physical dimensions and appearance of the reference object.

The information obtaining function is also configured to obtain known physical dimensions and appearance of the reference object 202 as displayed on the display 402 of the portable electronic device 400, and to obtain current position and orientation of the first electronic device 300 in the virtual space by accessing the virtual space layer comprising information pertaining to position and orientation of the first electronic device in the virtual space.

The second electronic device may obtain the pointer using the image of the reference object which the second electronic device imaged. The second electronic device may obtain the pointer by interpreting the image of the reference object which the second electronic device imaged. The second electronic device may decode the image of the reference object and extract the pointer from the image of the reference object. The pointer can be referred to the pointer information.

Additionally, variations to the disclosed variants can be understood and effected by the skilled person in practicing the claimed invention, from a study of the drawings, the disclosure, and the appended claims.

The invention claimed is:

1. A computer implemented method for positioning and orienting a second electronic device in a virtual space to be shared with a first electronic device already positioned and oriented in the virtual space, the method comprising:
   imaging, by a camera of the second electronic device, a reference object displayed on a display of the first electronic device;
   obtaining, from the first electronic device, a pointer to where to access a virtual space layer being a place in the cloud where information pertaining to position and orientation of the first electronic device in the virtual space is stored;
   obtaining known physical dimensions and appearance of the reference object as displayed on the display of the first electronic device;
   obtaining current position and orientation of the first electronic device in the virtual space by accessing, via the pointer, the virtual space layer comprising information pertaining to position and orientation of the first electronic device in the virtual space;
   determining a relative distance and orientation of the second electronic device to the first electronic device based on the known physical dimensions and appearance of the reference object as displayed on the display of the first electronic device and apparent dimensions and appearance of the reference object as imaged by the camera of the second electronic device; and
   determining position and orientation of the second electronic device in the virtual space based on the current position and orientation of the first electronic device in the virtual space and the determined relative distance and orientation of the second electronic device to the first electronic device.

2. The method according to claim 1, wherein current position and orientation of the first electronic device in the virtual space is a position and orientation of the first electronic device in the virtual space at a time of imaging (S108) the reference object displayed on the display of the first electronic device.

3. The method according to claim 1, wherein obtaining known physical dimensions and appearance of the reference object comprises accessing the virtual space layer comprising the known physical dimensions and appearance of the reference object.

4. The method according to claim 1, wherein the act of obtaining known physical dimensions and appearance of the reference object as displayed on the display of the first electronic device comprises:
   displaying, on the display of the first electronic device, information pertaining to known physical dimensions and appearance of the reference object, and
   acquiring at the second electronic device the information pertaining to physical dimensions and appearance of the reference object, using the camera of the second electronic device.

5. The method according to claim 4, further comprising encoding the information pertaining to known physical dimensions and appearance of the reference object as a machine-readable optical label,
   wherein displaying the information pertaining to known physical dimensions and appearance of the reference object comprises displaying the machine-readable optical label, and
   wherein acquiring the information pertaining to physical dimensions and appearance of the reference object comprises decoding the machine-readable optical label.

6. The method according to claim 5, wherein the machine-readable optical label constitutes the reference object.

7. The method according to claim 5, wherein a machine-readable optical label constitutes the reference object and wherein the machine-readable optical code comprises the pointer to the virtual space layer.

8. A non-transitory computer-readable recording medium having recorded thereon a program executable on an electronic device having processing capabilities, wherein the program comprising program code portions which when executed on the electronic device is configured to execute:
   an information obtaining function configured to obtain current position and orientation of a portable electronic device positioned and oriented in a virtual space,
   an imaging function, configured to image, by a camera of the electronic device, a reference object displayed on a display of the portable electronic device, and
   an orientation function configured to:
      determine a relative distance and orientation of the electronic device to the portable electronic device based on the known physical dimensions and appearance of the reference object as displayed on the display of the portable electronic device and apparent dimensions and appearance of the reference object as imaged by the camera of the electronic device, and
      determine position and orientation of the electronic device in the virtual space based on the current position and orientation of the portable electronic device in the virtual space and the determined relative distance and orientation of the electronic device to the portable electronic device, wherein the information obtaining function is further configured to;
      obtain a pointer to where to access a virtual space layer being a place in the cloud where information pertaining to position and orientation of the portable electronic device in the virtual space is stored,
      obtain known physical dimensions and appearance of the reference object as displayed on the display of the portable electronic device, and
      obtain current position and orientation of the portable electronic device in the virtual space by accessing, via the pointer, the virtual space layer comprising information pertaining to position and orientation of the portable electronic device in the virtual space.

9. A non-transitory computer-readable recording medium having recorded thereon a program executable on a portable electronic device having processing capabilities, wherein the program comprises program code portions which when executed on the portable electronic device is configured to execute:
   a transferring function, configured to transfer, to a virtual space layer being a place in the cloud, information pertaining to current position and orientation of the portable electronic device in a virtual space in which the portable electronic device is already positioned and oriented in,
   a display function configured to display, on a display of the portable electronic device, a reference object having known physical dimensions and appearance, and an encoding function configured to encode information into an image of the reference object in the form of information comprising a pointer to where to access the virtual space layer where information pertaining to position and orientation of the portable electronic device in the virtual space is stored.

10. The non-transitory computer-readable recording medium according to claim 9, wherein the encoding function is configured to encode information pertaining to the pointer into the image of the reference object as a machine-readable optical label, wherein the machine-readable optical label constitutes the reference object.

11. An electronic device comprising a camera and circuitry configured to execute:
  an information obtaining function configured to obtain current position and orientation of a portable electronic device as positioned and oriented in a virtual space;
  an imaging function, configured to image, by the camera, a reference object displayed on a display of the portable electronic device; and
  an orientation function configured to:
    determine a relative distance and orientation of the electronic device to the portable electronic device based on the known physical dimensions and appearance of the reference object as displayed on the display of the portable electronic device and apparent dimensions and appearance of the reference object as imaged by the camera, and
    determine position and orientation of the electronic device in the virtual space based on the current position and orientation of the portable electronic device in the virtual space and the determined relative distance and orientation of the electronic device to the portable electronic device, wherein the information obtaining function is further configured to;
      obtain a pointer to where to access a virtual space layer being a place in the cloud where information pertaining to position and orientation of the portable electronic device in the virtual space is stored,
      obtain known physical dimensions and appearance of the reference object as displayed on the display of the portable electronic device,
      obtain current position and orientation of the portable electronic device in the virtual space by accessing, via the pointer, the virtual space layer comprising information pertaining to position and orientation of the portable electronic device in the virtual space.

12. A portable electronic device comprising a display and circuitry configured to execute:
  a transferring function, configured to transfer, to a virtual space layer being a place in the cloud, information pertaining to current position and orientation of the portable electronic device in a virtual space in which the portable electronic device is already positioned and oriented in,
  a display function configured to display, on the display, a reference object having known physical dimensions and appearance, and
  an encoding function configured to encode information into an image of the reference object in the form of information comprising a pointer to where to access the virtual space layer where information pertaining to position and orientation of the portable electronic device in the virtual space is stored.

13. The portable electronic device according to claim 12, wherein the encoding function is configured to encode information pertaining to the pointer into the image of the reference object as a machine-readable optical label, and wherein the machine-readable optical label constitutes the reference object.

* * * * *